(12) United States Patent
Romer et al.

(10) Patent No.: US 11,291,987 B2
(45) Date of Patent: Apr. 5, 2022

(54) PERMANENT-MAGNET PISTON ASSEMBLY COMPRISING AN EXOSKELETON WHICH HOLDS PERMANENT-MAGNET ARRANGEMENTS FOR A PIPETTING APPARATUS

(71) Applicant: Hamilton Bonaduz AG, Bonaduz (CH)

(72) Inventors: Hans-Peter Romer, Hinwil (CH); Heidi Cattaneo, Landquart (CH)

(73) Assignee: Hamilton Bonaduz AG, Bonaduz (CH)

( * ) Notice: Subject to any disclaimer, the term of this patent is extended or adjusted under 35 U.S.C. 154(b) by 273 days.

(21) Appl. No.: 16/343,209

(22) PCT Filed: Oct. 11, 2017

(86) PCT No.: PCT/EP2017/075951
§ 371 (c)(1),
(2) Date: Apr. 18, 2019

(87) PCT Pub. No.: WO2018/073073
PCT Pub. Date: Apr. 26, 2018

(65) Prior Publication Data
US 2019/0247844 A1    Aug. 15, 2019

(30) Foreign Application Priority Data
Oct. 18, 2016   (DE) ................. 10 2016 220 424.6

(51) Int. Cl.
*B01L 3/02*       (2006.01)
*G01N 35/10*      (2006.01)
(Continued)

(52) U.S. Cl.
CPC .......... *B01L 3/0227* (2013.01); *B01L 3/0217* (2013.01); *B01L 3/565* (2013.01);
(Continued)

(58) Field of Classification Search
None
See application file for complete search history.

(56) References Cited

U.S. PATENT DOCUMENTS 4,660,249 A * 4/1987 Popovic ................. B23K 1/018
15/341
5,437,565 A    8/1995 Atsumi et al.
(Continued)

FOREIGN PATENT DOCUMENTS

DE  10 2012 214 677    2/2014
EP       0 605 903    7/1994
(Continued)

OTHER PUBLICATIONS

German Search Report dated May 15, 2017 in DE 10 2016 220 424.6.
(Continued)

*Primary Examiner* — Matthew D Krcha
*Assistant Examiner* — Brittany I Fisher
(74) *Attorney, Agent, or Firm* — Tollefson IP

(57) ABSTRACT

A permanent-magnet piston subassembly (10) for a pipetting apparatus, the piston subassembly (10) extending along a piston axis (K) and comprising a plurality of permanent-magnet arrangements (14a to 14m) that are arranged one behind another along the piston axis (K) with alternatingly opposite polarization directions in such a way that for each two permanent-magnet arrangements (14i, 14j) directly successive along the piston axis, it is the case that magnetic poles located closest to one another along the piston axis (K), of different successive permanent-magnetic arrangements (14a to 14m), are like poles, is characterized in that the piston subassembly (10) encompasses a sheath tube (12), extending along the piston axis (K) constituting a tube axis (H), in which the plurality of permanent-magnet arrangements (14a to 14m) are received.

16 Claims, 2 Drawing Sheets

Figure 1:
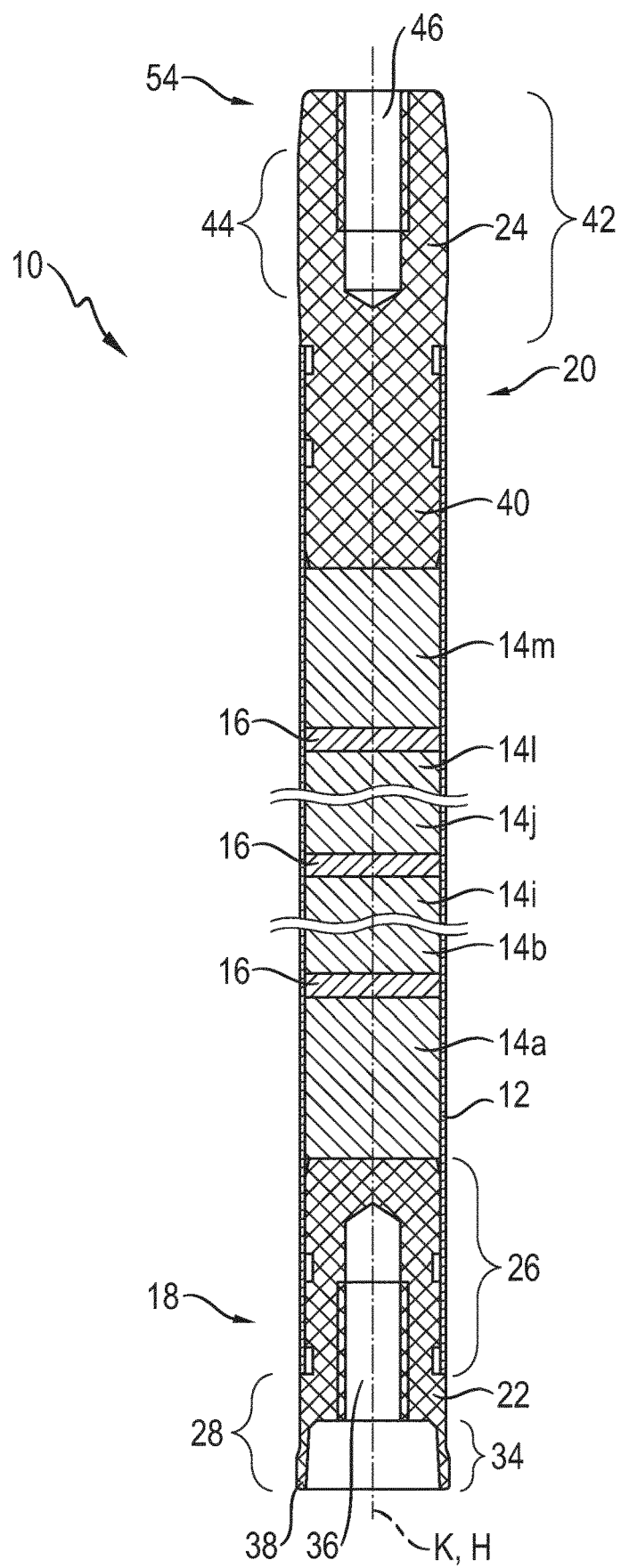

(51) Int. Cl.
  *H01F 7/16* (2006.01)
  *H01F 7/02* (2006.01)
  *B01L 3/00* (2006.01)

(52) U.S. Cl.
  CPC ....... *G01N 35/1016* (2013.01); *H01F 7/1615* (2013.01); *B01L 2300/0803* (2013.01); *B01L 2300/0832* (2013.01); *B01L 2400/043* (2013.01); *H01F 7/02* (2013.01)

(56) References Cited

U.S. PATENT DOCUMENTS

| | | | | |
|---|---|---|---|---|
| 5,472,323 | A | * | 12/1995 | Hirabayashi .......... F04B 17/046 310/35 |
| 8,449,274 | B1 | * | 5/2013 | Zelechonok ............ F04B 17/04 417/417 |
| 2013/0001242 | A1 | * | 1/2013 | Hofstetter ............. F04B 17/044 222/333 |

FOREIGN PATENT DOCUMENTS

| | | | |
|---|---|---|---|
| EP | 2 656 917 | | 10/2013 |
| JP | 06185456 | A * | 7/1994 |
| JP | 2003274626 | A * | 9/2003 |
| JP | 2008-193760 | | 8/2008 |
| JP | 2012-167968 | | 9/2012 |

OTHER PUBLICATIONS

International Seach Report and Chinese Office Action issued by the Chinese Patent Office dated Jan. 6, 2021, for the Chinese patent family member of PCT/EP2017/075951.

JP Office Action dated Sep. 27, 2021, for related application.

\* cited by examiner

PERMANENT-MAGNET PISTON ASSEMBLY COMPRISING AN EXOSKELETON WHICH HOLDS PERMANENT-MAGNET ARRANGEMENTS FOR A PIPETTING APPARATUS

CROSS-REFERENCE TO RELATED APPLICATIONS

This application is the National Stage of International Application No. PCT/EP2017/075951, filed on Oct. 11, 2017, which claims the benefit of German Application No. 10 2016 220 424.6, filed on Oct. 18, 2016. The contents of both applications are hereby incorporated by reference in their entirety.

The present invention relates to a permanent-magnet piston subassembly for a pipetting apparatus, the piston subassembly extending along a piston axis and comprising a plurality of permanent-magnet arrangements that are arranged one behind another along the piston axis with alternatingly opposite polarization directions in such a way that for each two permanent-magnet arrangements directly successive along the piston axis, it is the case that magnetic poles located closest to one another along the piston axis, of different successive permanent-magnetic arrangements, are like poles.

A piston subassembly of the species is known from WO 2011/083125. The teaching of this known document is to arrange the permanent-magnet arrangements with alternatingly opposite polarizations in order to generate, where like poles of different magnet arrangements are mutually oppositely located, a magnetic field having a large gradient along the piston axis; this facilitates position detection of the piston subassembly in a guidance tube of a pipetting apparatus using magnetic field-based sensors, and enhances detection accuracy.

Although the document indicated does not provide detailed information regarding the physical structure of the piston subassembly, such permanent-magnet piston subassemblies are usually installed by the fact that hollow-cylindrical permanent magnets are adhesively bonded at the ends to one another in the corresponding polarization sequence, and are additionally threaded onto a carrier rod that passes through the permanent magnets and is secured in position at the ends with corresponding clamping means, for example washers and nuts.

This physical embodiment of the piston subassembly has the advantage that the individual permanent magnets can form a radial outer side of the piston subassembly, and that a radial (with reference to the piston axis) gap between the permanent magnets and an external magnetic field driving the piston arrangement to move can be minimized, thereby increasing the effectiveness of a magnetic motion drive system.

This advantage is, however, accompanied by disadvantages. Compared with solid permanent magnets having the same external dimensions, the hollow-cylindrical permanent magnets produce a weaker magnetic field because of the missing central mass. In addition, because the permanent magnets are arranged alternatingly with opposite polarizations, considerable forces are exerted on the carrier rod passing centrally through them, so deformations of the completely installed piston subassembly can occasionally occur, with the result that the piston subassembly no longer has a circularly cylindrical, or in general cylindrical, outer contour. But because the piston subassemblies are guided movably in cylindrical guidance tubes of pipetting apparatuses along the guidance tube axis (cylinder axis) that then coincides with the piston axis, the possible deformations then cause problems upon installation and operation of a pipetting apparatus equipped with a permanent-magnet piston subassembly.

The object of the present invention is therefore to improve the permanent-magnet piston subassembly of the species in such a way that it can be manufactured with greater geometrical accuracy with an at least equally effective capability for coupling an external magnetic field for driving it to move along the piston axis.

The present invention achieves this object by way of a permanent-magnet piston subassembly of the kind recited previously which encompasses a sheath tube, extending along the piston axis constituting a tube axis, in which the plurality of permanent-magnet arrangements are received.

Thanks to the use of the sheath tube in which the plurality of permanent-magnet arrangements are received, the outer contour of the sheath tube can also determine the outer contour of the piston subassembly. Even if the sheath tube has the same mass as a carrier rod securing a plurality, of equal length, of permanent-magnet arrangements, the sheath tube is less easily deformable for a given applied force because of the greater radial distance of its mass from the piston axis. Even when the tube wall is thin, the area moment of inertia of the sheath tube for flexure around any flexure axis orthogonal to the piston axis is considerably greater than for a carrier rod of identical mass.

The use of the sheath tube surrounding the plurality of permanent-magnet arrangements does enlarge, by an amount equal to the thickness of the tube wall, the radial gap between the permanent-magnet arrangements and the magnetic field-generating means that radially surround them. This enlarged gap is more than compensated for, however, by the possibility of embodying the permanent-magnet arrangements to be solid, i.e. without a central through hole penetrating them.

The term "permanent-magnet arrangement" refers here to any arrangement having one or several permanent magnets that form a north pole and a south pole. The permanent-magnet arrangement can be constituted from several individual permanent magnets that are provided successively with the same polarity. This can be advantageous in terms of production engineering.

Preferably, however, in order to minimize the number of components that are necessary for manufacture of the permanent-magnet piston subassembly, a permanent-magnet arrangement encompasses exactly one permanent magnet.

The plurality of permanent-magnet arrangements thus preferably encompasses a plurality of permanent magnets, the number of permanent magnets particularly preferably being equal to the number of permanent-magnet arrangements.

Thanks to the use of the sheath tube, the permanent magnets no longer necessarily have to be adhesively bonded to one another. This facilitates installation of the piston subassembly. For immobilization of the permanent magnets in the sheath tube, they can be joined to the sheath tube using adhesive. It is sufficient for this purpose, however, to equip the radially inwardly facing wall of the sheath tube and/or the enveloping surface of cylindrical or prismatic permanent magnets with adhesive, and then to introduce the permanent magnets into the sheath tube. It is likewise possible to secure the permanent magnets in their positions, after introduction into the sheath tube, using encapsulating compound. The use of encapsulating compound is possible in principle but is less preferred since an encapsulation component that has very low viscosity in the introduction state must be used because of advantageously small gap dimensions, or optionally the gap dimensions must be increased, so that the encapsulation compound can penetrate into the radial gaps between the sheath tube and permanent magnets. The use of adhesive, which can be applied even in very thin films, is therefore preferred.

For modification of the magnetic field proceeding from the permanent-magnet arrangements, it is advantageous if a soft-magnetic separating body is arranged between two permanent-magnet arrangements having mutually opposite like poles directly successive along the piston axis. The material of the soft-magnetic separating body can be a ferromagnetic or ferrimagnetic material. It is preferably ferromagnetic.

Thanks to the use of soft-magnetic, i.e. magnetizable but not permanently magnetized, material, for example iron, nickel, and magnetizable alloys thereof, it is possible, specifically in the abutment region between two mutually facing longitudinal ends of permanent-magnet arrangements having like poles, to modify the magnetic field proceeding from them advantageously as compared with an air gap, so that there exists in the axial portion of an abutment region a particularly strong magnetic field gradient that is detectable with high positional accuracy and low error tolerance using magnetic-field-sensitive sensors, for example Hall sensors.

An axially narrow separating body is sufficient for the desired effect, so that the at least one soft-magnetic separating body is preferably a disk-shaped separating body whose average radial dimension orthogonally to the piston axis is larger than its average axial dimension along the piston axis.

For example, the disk-shaped separating body can be embodied as a flat cylinder whose radial dimension from the piston axis to its radially outermost edge can be twice, five times, or even more than five times as large as its axial dimension, depending on the conformation of the permanent-magnet arrangements.

If the separating body does not have a constant radial dimension in a circumferential direction, but instead its radial dimension is positionally dependent, what is to be ascertained as an average radial dimension is the average value of all radial dimensions along the circumference over a representative circumference portion. The same applies to the axial dimension, the separating body preferably having parallel and mutually flat end faces and having between them a circularly cylindrical outer enveloping surface that connects the end faces.

Although in accordance with a refinement of the present invention, the separating body can be an annular disk-shaped separating body having a central axially passthrough recess, the use of solid separating bodies is preferred.

Preferably a respective soft-magnetic separating body is provided between each abutment point of the piston subassembly at which like poles of different permanent-magnet arrangements are successive in an axial direction.

In order to secure the separating bodies in position in the sheath tube, provision can be made that the at least one soft-magnetic separating body is joined to the sheath tube with adhesive or encapsulating compound.

Preferably the permanent magnets, like the separating bodies, are adhesively joined only to the sheath tube but not to one another, which allows the permanent-magnet arrangements to come as axially close as possible to one another or to a separating body.

The separating body preferably has on its outer circumference the same conformation as a permanent magnet located axially adjacent to it. Preferably all the permanent-magnet arrangements or permanent magnets of the piston subassembly have the same conformation at least on their outer circumference, the permanent magnets used in a piston subassembly being, in the interest of simplified manufacture, particularly preferably identical in terms of design and thus in terms of conformation. The separating bodies thus preferably do not differ from the permanent-magnet arrangements in terms of their outer circumferential conformation, and differ from them only with regard to the material used to constitute them and with regard to their axial length.

In principle, separating bodies and/or permanent-magnet arrangements can have any conformation that fits into the respective sheath tube, i.e. can be prismatic or cylindrical, preferably regularly prismatic or circularly cylindrical in shape. For the reasons already recited, both the permanent-magnet arrangements and the separating bodies are solid.

Also preferably, the permanent-magnet arrangements and/or the separating bodies are embodied on their outer circumference complementarily to the conformation of the inner wall of the sheath tube. "Complementarily" is intended in particular to encompass the case in which the radial gap constituted between a permanent magnet and/or a separating body and the inner-wall portion located radially opposite it is substantially constant along a circular path around the piston axis. This is preferably true for all cross sections orthogonal to the piston axis.

For effective aspiration and dispensing of liquids by a pipetting apparatus utilizing the piston subassembly discussed here, it is necessary for the piston subassembly to be sealed or at least sealable with respect to a guidance tube, surrounding it radially, of a pipetting apparatus. This can be achieved, for example, by way of a liquid, in particular viscous, sliding film on the outer side of the sheath tube; a sealing film of this kind can also have a friction-reducing effect. The use of such a "sealing film" between the piston subassembly and guidance tube creates the risk of contamination of the liquid that is to be pipetted, however, since it cannot be ruled out that at least traces of the sealing liquid might travel out of the guidance tube constituting the cylinder of the piston subassembly into the respective pipetting tip.

The piston subassembly of the present invention therefore preferably comprises at an axial longitudinal end, which will be referred to hereinafter as a "sealing longitudinal end," a sealing arrangement joined to the sheath tube for movement together. This sealing arrangement is a solid-state sealing arrangement. With the piston subassembly in the operationally ready state, the sealing longitudinal end is preferably the longitudinal end that is located closest to the pipetting tip of a pipetting apparatus.

To allow a permanent-magnet arrangement travel of the piston subassembly to be effected separately from the sealing function, the sealing arrangement preferably comprises at the sealing longitudinal end a sealing portion that proceeds axially in a direction away from the sheath tube and projects at least in an axial portion radially beyond the sheath tube, so that the sheath tube can be inserted into the guidance tube (cylinder) of the pipetting apparatus accompanied by formation of a radial gap with respect to said tube that surrounds it. As a result of the radial projection of the sealing portion beyond the sheath tube, the radial gap between the sheath tube and guidance tube can be spanned and the piston arrangement can thus be sealed with respect to the guidance tube. The axial portion protruding radially beyond the sheath tube advantageously extends in a circumferential direction so as to proceed completely around the piston's physical axis, so that in the fully installed state the sealing portion can be in contact with the guidance tube along an annular band proceeding around the piston axis.

To minimize any unnecessary increase in the moving mass of the piston subassembly, the sealing portion comprises a sleeve configuration which protrudes away from the sheath tube and on which the axial portion projecting radially beyond the sheath tube is embodied. The sealing portion can have a bell-shaped conformation when viewed in longitudinal section. The radially inner recess of the sleeve configuration can be simply circularly cylindrical for reasons of production engineering or, in the case in which the sealing arrangement is manufactured by injection molding, can be embodied to widen out away from the sheath tube, in particular to widen conically.

Connection of the sealing arrangement to the sheath tube can be implemented in simple fashion by the fact that the sealing arrangement comprises a connecting portion that projects axially into the sheath tube and is connected to the sheath tube. The connecting portion can comprise, radially externally, a contour that increases engagement force, for example a sawtooth contour having flanks inclined to different extents, so that introduction of the connecting portion into the sheath tube can be achieved with less force than withdrawal of the connecting portion from the sheath tube in the opposite direction. Additionally or alternatively, the connecting portion can also be immobilized on the sheath tube using adhesive and/or encapsulating compound.

In order to decrease moving mass, simplify installation of the sealing arrangement, and adjust (optionally in metered fashion) the clamping force retaining the connecting portion on the sheath tube, the connecting portion can comprise a central recess in an axial region, preferably in an axial portion axially adjacent to the sleeve configuration. The central recess can preferably comprise a thread, so that an installation tool is temporarily attachable to the connecting portion. In the fully installed state, a clamping plug can be introduced into the central recess so that with elastic radial deformation of the connecting portion, the clamping force acting between the connecting portion and the sheath tube portion surrounding it is increased.

In order to further ensure that the sheath tube of the piston subassembly, sealed as described above at one end against the guidance tube of a pipetting apparatus, does not impact against the guidance tube at the other longitudinal end located remotely from the sealing longitudinal end (which would be possible in principle because of the clearance due to the radial gap between the sheath tube and guidance tube), in a refinement of the piston subassembly of the present Application it is conceivable to provide a further sealing arrangement or a centering component at its other longitudinal end that is located oppositely from the sealing longitudinal end of the piston subassembly. In the event that a further sealing arrangement is arranged, it is preferably identical to the sealing arrangement at its sealing longitudinal end.

The centering component, conversely, does not necessarily provide sealing of the piston subassembly with respect to the sheath tube, but instead merely ensures that the radial gap existing between the sheath tube and guidance tube remains in existence at the other longitudinal end as well even during movements of the piston subassembly, and that impacting of the sheath tube against the guidance tube is prevented.

The centering component can therefore comprise a centering portion that protrudes axially in a direction away from the sheath tube. Because a sealing effect does not need to be expected from the centering portion, the maximum radial dimension of the centering portion can preferably be smaller than the maximum radial dimension of the sealing arrangement at the sealing longitudinal end. The piston subassembly is always to be considered in this context as being in a state in which it is not surrounded by a guidance tube but instead is exposed. This dimensional correlation is applicable in particular when the centering portion is embodied to proceed uninterruptedly around the piston axis. An embodiment of the centering portion that is interrupted in a circumferential direction around the piston axis would also suffice for centering, however, for example in the form of three centering fingers, equidistant in a circumferential direction, that protrude from the sheath tube. The number of centering fingers can be greater than three, but a quantity of three fingers, which are spaced at an angular distance of 120° apart from one another, is preferred. In this case the fingers can be embodied to be very narrow in a circumferential direction so that their frictional effect is small but their centering effect is not impaired. For the case in which the centering portion has a finger-like embodiment, its radial dimension in a state in which the piston subassembly is removed from a guidance tube can also certainly be larger than the maximum radial dimension of the sealing arrangement.

Again in order to reduce moving mass, provision can be made that the centering portion comprises a recess that is central in a radial direction and proceeds in an axial direction. It is preferable to select for the sealing arrangement and/or for the further sealing arrangement and/or for the centering component a material having the least possible friction, which forms at least the contact surfaces that are in sliding contact with the guidance tube that surrounds the piston subassembly during operation. Because the guidance tube is constituted as a rule from glass, in order to reduce friction provision can be made that the sealing arrangement and/or the further sealing arrangement and/or the centering component is constituted, at least on a radially outward-facing surface of the sealing portion or of the centering portion, from a plastic filled with solid particles, in particular from PTFE or polyolefin filled with mica particles and/or graphite particles. The low-friction materials recited above for constituting the contact surfaces can also be used on guidance tubes made of other materials, for example on metallic guidance tubes.

In the interest of simple manufacture, the sealing arrangement as a whole or the centering component as a whole is preferably constituted from one of the aforementioned materials, preferably by injection molding.

The sheath tube is constituted from a nonmagnetic and also non-magnetizable material, particularly preferably from high alloy stainless steel, since the latter can be manufactured with high inherent rigidity, and with excellent geometrical and dimensional accuracy, using thin walls.

Not to be excluded, however, is that the sheath tube is also constituted from plastic, in particular fiber- and/or particle-reinforced plastic, with the result that strength values similar to those with the aforementioned high alloy steel can be achieved, with less mass.

The sheath tube is preferably embodied as a continuous tube, but in order to reduce mass it can also be embodied as a skeleton tube having radial perforations.

The present invention further relates to a pipetting apparatus having a piston subassembly embodied as described above.

The pipetting apparatus comprises a guidance tube extending along a cylinder axis, in which the piston arrangement, having a piston axis coaxial with the cylinder axis, is received.

Coil windings which, by energization, generate a magnetic field with which the piston arrangement can be driven to move axially along the cylinder axis, are preferably arranged radially outside the piston receiving space of the guidance tube.

The pipetting apparatus comprises a coupling configuration onto which a pipetting tip is intentionally detachably couplable. That longitudinal end of the guidance tube which is located closer to the coupling configuration is its coupling longitudinal end. The guidance tube communicates fluid-dynamically with the coupling configuration.

In accordance with an advantageous refinement of the present invention, the guidance tube of the pipetting apparatus is open, or is closed off by an intentionally detachable cover, at its longitudinal end (servicing longitudinal end) located remotely from the coupling configuration.

If the sealing arrangement and/or the centering component exhibits wear phenomena as a result of sliding abutment against the guidance tube during operation, the piston subassembly can easily be replaced by extending it, by means of the coils of its motion drive system, away from the coupling configuration through the open servicing longitudinal end of the guidance tube, sufficiently far that it can be grasped manually or with a tool and pulled out of the guidance tube. If necessary, the intentionally detachable cover is previously to be removed from the guidance tube for this purpose. Either the at least one sealing arrangement and/or the centering component on the piston subassembly can then be replaced, or the piston subassembly as a whole can be exchanged.

The overhauled or new piston subassembly is introduced into the guidance tube through the open servicing longitudinal end thereof, and moved into the guidance tube, manually or using a tool, until it is located sufficiently within the effective range of the coils of the electromagnetic drive system. The latter can then drive the piston subassembly to move axially, preferably firstly into a reference position, for example a top dead center point, from which detection of the piston subassembly position is then referenced. The pipetting apparatus and its control system are then set up to continue pipetting operation.

Figure 2:
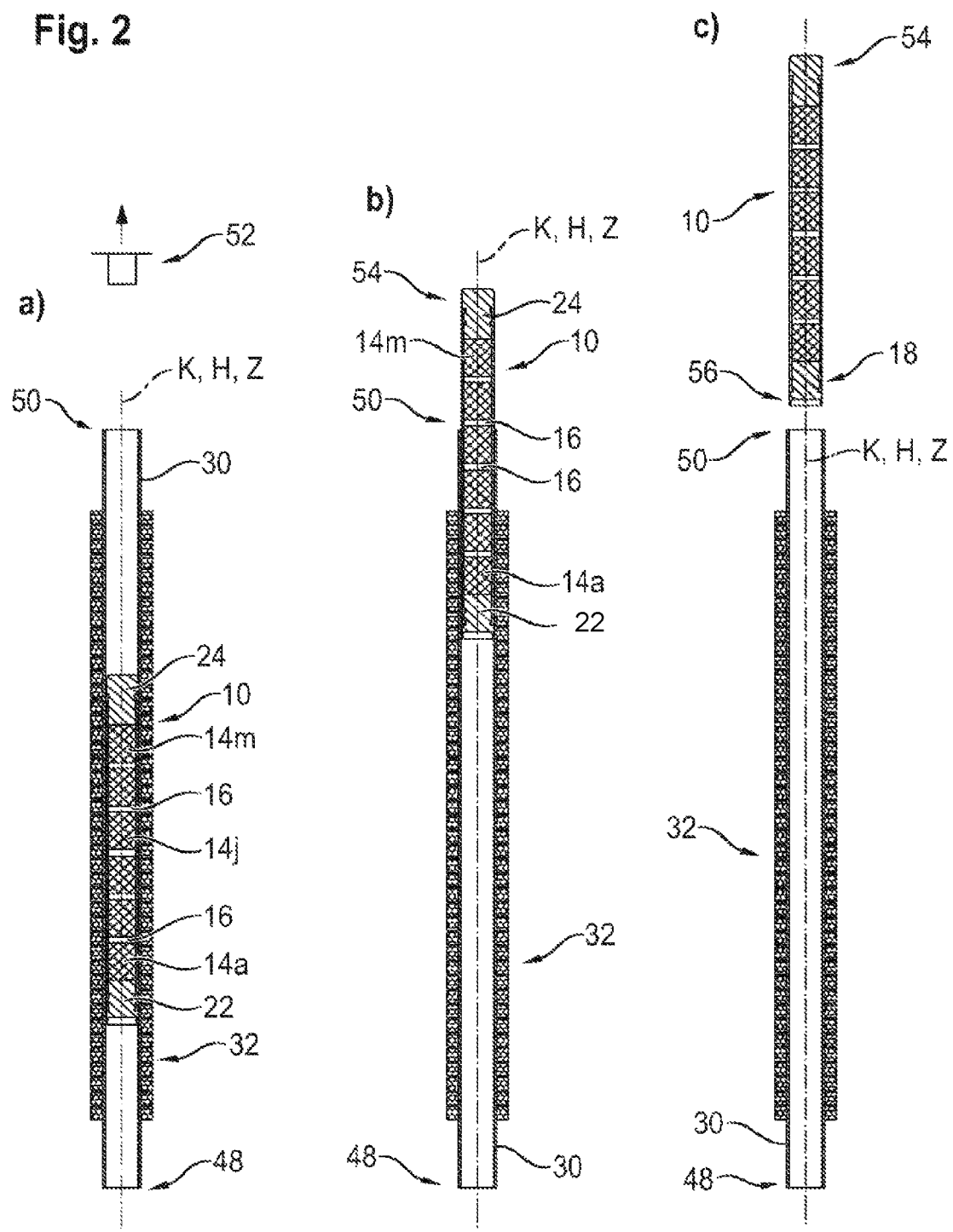

The present invention will be explained in more detail below with reference to the appended Figures, in which:

FIG. 1 is a schematic longitudinal section view through an embodiment according to the present invention of a permanent-magnet piston subassembly of the present invention; and FIGS. 2a to 2c depict an embodiment according to the present invention of a schematically depicted pipetting apparatus having the piston subassembly of FIG. 1, received movably in the guidance tube, in different relative positions relative to the guidance tube; and depict the coil arrangement that surrounds the guidance tube and constitutes a drive apparatus.

In FIG. 1 an embodiment according to the present invention of a permanent-magnet subassembly of the pipetting apparatus of the present invention is labeled generally with the number 10.

Piston subassembly 10 extends along a piston axis K and encompasses a sheath tube 12 that is concentric with piston axis K and forms a kind of exoskeleton of piston arrangement 10. For strength reasons, sheath tube 12 can be constituted from a nonmagnetic and non-magnetizable metal, for example a high alloy stainless steel. Given weight considerations, however, the sheath tube can also be made of plastic, in particular (for strength reasons) of filled, especially fiber-reinforced plastic.

A sheath-tube axis H thus coincides with piston axis K.

Several permanent-magnet arrangements 14a, . . . , 14i to 14m are preferably arranged in sheath tube 12 successively along piston axis K, a preferably ferromagnetic separating body 16 being arranged between each two directly axially successive permanent-magnet arrangements 14i, 14j.

In the present case, all separating bodies 16 are embodied identically and have a substantially shorter axial length than permanent-magnet arrangements 14i, 14j adjoining them on either side.

Permanent-magnet arrangements 14a to 14m are arranged in such a way that like poles face toward one another at two permanent-magnet arrangements 14i, 14j located axially closest to one another, and adjoin the separating bodies located between those permanent-magnet arrangements. For example, in FIG. 1 the north pole of permanent-magnet arrangement 14a can adjoin separating body 16. The north pole of permanent-magnet arrangement 14b can likewise adjoin separating body 16 located between permanent-magnet arrangements 14a and 14b. Permanent-magnet arrangements 14a to 14m are thus arranged with alternating polarizations along piston axis K in order to generate in the region of separating bodies 16 a magnetic field gradient that is axially as pronounced as possible.

The magnetic field resulting from the arrangement of permanent-magnet arrangements 14a to 14m with alternating polarization serves both to provide a maximally effective coupling of the piston magnetic field to the magnetic field of coil arrangement 32 that surrounds guidance tube 30 (see FIGS. 2a to 2c), in order to furnish an effective linear-motor drive system having maximum positional accuracy, and also to achieve the highest possible resolution for positional sensing of the piston position, for example by way of Hall sensors outside guidance tube 30 along the piston axis (not depicted).

In the present case each permanent-magnet arrangement 14a to 14m is constituted by exactly one permanent magnet. Constituting a permanent-magnet arrangement having a north pole and a south pole from several permanent magnets, or from a combination of permanent magnets and magnetizable components, is not to be excluded, however, if such might be useful in terms of production engineering.

Permanent-magnet arrangements 14a to 14m and separating bodies 16 arranged between them can be adhesively bonded to the inner wall of sheath tube 12 by way of an adhesive film, and thereby secured in position. Sheath tube 12 can be coated with adhesive on its inner wall for that purpose, before the permanent-magnet arrangements and separating bodies 16 are introduced. Additionally or alternatively, the permanent-magnet arrangements and separating bodies can be coated with adhesive on their outer enveloping surfaces.

An adhesive application between permanent-magnet arrangements 14a to 14m and their respectively adjacent separating bodies 16, for example on the end surfaces that respectively touch one another, is possible in principle but not necessary, so that the packing made up of permanent-magnet arrangements 14a and 14m and separating bodies 16 arranged therebetween can be constructed as axially tightly as possible.

Sheath tube 12 in the present case is preferably circularly cylindrical. In the present case, permanent-magnet arrangements 14a are preferably solidly circularly cylindrical, as are the soft-magnetic, preferably ferromagnetic, separating bodies 16.

Sheath tube 12 comprises at one end a sealing longitudinal end 18, and comprises a further longitudinal end 20 located oppositely from sealing longitudinal end 18.

A sealing arrangement 22 in the form of a sealing component is preferably provided at sealing longitudinal end 18. A sealing component 22, or centering component 24 depicted in FIG. 1, can likewise be provided at the oppositely located longitudinal end 20.

Sealing component 22 comprises a connecting portion 26 that projects axially into sheath tube 12 at its sealing longitudinal end 18 and can likewise be adhesively bonded to the inner wall of sheath tube 12 by means of an adhesive.

Sealing component 22 furthermore comprises a sealing portion 28 that protrudes in an axial direction away from sheath tube 12. This sealing portion 28 preferably comprises a sleeve configuration 34 that, for example, can be embodied in a bell shape widening axially away from sheath tube 12. A portion of sleeve configuration 34 protrudes radially beyond sheath tube 12 so that it can come into abutment against guidance tube 30 without interference from sheath tube 12, and can thereby perform its sealing function.

The sealing arrangement or sealing component 22 can comprise a central recess 36 into which a tool or a threaded rod can be threaded so that, for example, sealing component 22 can be pulled out of sheath tube 12 or so that it can be pressed radially against the inner wall of sheath tube 12 and thereby anchored more strongly on sheath tube 12.

That region of sleeve portion 34 which projects radially beyond sheath tube 12 forms a sealing lip 38 proceeding around piston axis K.

Centering component 24, shown by way of example at the other longitudinal end 20 of sheath tube 12, also comprises a fastening portion 40 that, analogously to connecting portion 26, is introduced axially into sheath tube 12 from longitudinal end 20. Fastening portion 40 can also be connected adhesively, by way of an adhesive, to the inner wall of sheath tube 12. Centering component 24 furthermore comprises a centering portion 42 that protrudes axially out of sheath tube 12 and beyond it, an effective portion 44 of centering portion 42 having a radially larger dimension than sheath tube 12 and projecting radially beyond the latter either along the entire circumference or locally in distributed fashion around the circumference. The radial projection of effective portion 44 is preferably less than the radial projection of sleeve portion 34 of centering component 22 in order to avoid unnecessary frictional resistance at centering component 24. Centering component 24 serves, together with sealing component 22, to avoid contact between sheath tube 12 and the guidance tube that surrounds it in an operational context.

Centering component 24 as well can comprise a recess 46, accessible from its free longitudinal end, into which a tool is introducible and fastenable for easier removal of centering component 24 from sheath tube 12. Contrary to what is depicted in FIG. 1, recess 46 can extend axially into the region of sheath tube 12 and can serve to press centering component 24 radially against the inner wall of sheath tube 12. Centering component 24 and sealing component 22, which preferably are constituted in one piece, are preferably embodied from plastic, specifically from a filled thermoplastic, the plastic matrix preferably being polytetrafluoroethylene or a polyolefin, and solid particles of mica or graphite being embedded therein. Particularly low-friction and low-wear contact with guidance tube 30 that surrounds piston subassembly 10 in an operational context is thereby enabled.

FIGS. 2a to 2c show piston subassembly 10 of FIG. 1 in various relative positions.

By corresponding energization of coil arrangement 32, permanent-magnet piston subassembly 10 can be moved quickly and highly accurately along cylinder axis Z, which coincides with piston axis K during operation, of guidance tube 30.

Guidance tube 30 comprises a coupling longitudinal end 48 located closer to a coupling configuration (not depicted in FIG. 2) and, oppositely from it, a servicing-side longitudinal end or servicing longitudinal end 50.

Axially adjacent to coupling longitudinal end 48 is a region of the pipetting apparatus (not depicted in FIGS. 2a to 2c) to which guidance tube 30 belongs, a coupling configuration being provided thereon in a manner known per se for detachable temporary coupling of a pipetting tip.

In the example depicted, servicing-side longitudinal end 50 of guidance tube 30 is open. It can also be closed off by a cover 52 that is intentionally detachably arranged at servicing-side longitudinal end 50 and that constitutes an end stop of piston subassembly 10 in order to limit its axial motion path toward servicing-side longitudinal end 50.

After any removal of detachable cover 52, piston subassembly 10 can be moved in simple fashion axially out of guidance tube 30 at least far enough that its removal longitudinal end 54, constituted by centering component 24, is no longer surrounded by guidance tube 30 and can thus be grasped manually or with a tool. It is thereby possible to pull piston subassembly 10 axially completely out of guidance tube 30 and remove it completely from the guidance tube.

A serviced or new piston subassembly 10 can then be slid axially, starting with a piston-sealing longitudinal end 56 having sealing component 22, far enough into guidance tube 30 (see FIG. 2c) that a magnetic field generatable by coil arrangement 32 is thereby couplable to the magnetic field of permanent-magnet arrangements 14a to 14m sufficiently that piston subassembly 10 can be pulled by the magnetic field of coil arrangement 32 completely into guidance tube 30. Cover 52 can then be mounted again, if necessary, on servicing-side longitudinal end 50 of guidance tube 30.

In order to set up the pipetting apparatus to be ready for operation again after a replacement of piston subassembly 10, coil arrangement 32 can move the pulled-in piston subassembly 10 into a defined reference position, determined e.g. by a mechanical stop, in which its sensor system becomes referenced to the known position. The pipetting arrangement is then once again ready for operation with high dynamics and high accuracy.

The invention claimed is:

1. A permanent-magnet piston subassembly for a pipetting apparatus, the piston subassembly extending along a piston axis and comprising a plurality of permanent-magnet arrangements that are arranged one behind another along the piston axis with alternatingly opposite polarization directions in such a way that for each two permanent-magnet arrangements directly successive along the piston axis, magnetic poles located closest to one another along the piston axis, of different successive permanent-magnet arrangements, being like poles, wherein the piston subassembly encompasses a sheath tube, extending along the piston axis constituting a tube axis, in which the plurality of permanent-magnet arrangements are received;

wherein the plurality of permanent-magnet arrangements encompasses a plurality of permanent magnets, at least some of the permanent magnets being joined to the sheath tube using adhesives and/or encapsulating compound;

wherein a soft-magnetic separating body is arranged between two permanent-magnet arrangements directly successive along the piston axis;

wherein the at least one soft-magnetic separating body is a disk-shaped separating body whose average radial dimension orthogonally to the piston axis is larger than its average axial dimension along the piston axis.

2. The permanent-magnet piston subassembly according to claim 1, wherein the at least one soft-magnetic separating body is joined to the sheath tube with adhesive or encapsulating compound.

3. The permanent-magnet piston subassembly according to claim 1, wherein the at least one soft-magnetic separating body has a prismatic or cylindrical conformation.

4. The permanent-magnet piston subassembly according to claim 1, wherein the plurality of permanent-magnet arrangements encompasses a plurality of permanent magnets, at least some of the permanent magnets having a prismatic or cylindrical conformation.

5. A pipetting apparatus having a piston subassembly according to claim 1.

6. The permanent-magnet piston subassembly according to claim 1, wherein the at least one soft-magnetic separating body has a solid prismatic or solid cylindrical conformation.

7. The permanent-magnet piston subassembly according to claim 1, wherein the plurality of permanent-magnet arrangements encompasses a plurality of permanent magnets, at least some of the permanent magnets having a solid prismatic or solid cylindrical conformation.

8. A permanent-magnet piston subassembly for a pipetting apparatus, the piston subassembly extending along a piston axis and comprising a plurality of permanent-magnet arrangements that are arranged one behind another along the piston axis with alternatingly opposite polarization directions in such a way that for each two permanent-magnet arrangements directly successive along the piston axis, magnetic poles located closest to one another along the piston axis, of different successive permanent-magnet arrangements, being like poles, wherein the piston subassembly encompasses a sheath tube, extending along the piston axis constituting a tube axis, in which the plurality of permanent-magnet arrangements are received, further comprising at an axial longitudinal end, constituting a sealing longitudinal end, a sealing arrangement joined to the sheath tube for movement together, which arrangement comprises a sealing portion that proceeds axially in a direction away from the sheath tube and comprises a sleeve configuration which protrudes axially away from the sheath tube and projects in an axial portion radially beyond the sheath tube.

9. The permanent-magnet piston subassembly according to claim 8, wherein the sealing arrangement comprises a connecting portion that projects axially into the sheath tube and is connected to the sheath tube.

10. The permanent-magnet piston subassembly according to claim 9, wherein where the connecting portion comprises a central recess in an axial region.

11. The permanent-magnet piston subassembly according to claim 9, wherein the connecting portion comprises a central recess in an axial portion axially adjacent to the sleeve configuration.

12. The permanent-magnet piston subassembly according to claim 8, wherein a further sealing arrangement or a centering component is provided at its other longitudinal end that is located oppositely from the sealing longitudinal end of the piston subassembly.

13. The permanent-magnet piston subassembly according to claim 12, wherein the centering component comprises a centering portion that protrudes axially in a direction away from the sheath tube, the maximum radial dimension of the centering portion being smaller than that of the sealing arrangement at the sealing longitudinal end.

14. The permanent-magnet piston subassembly according to claim 13, wherein the centering portion comprises a recess that is central in a radial direction and proceeds in an axial direction.

15. The permanent-magnet piston subassembly according to claim 8, wherein the sealing arrangement and/or the further sealing arrangement and/or the centering component is constituted, at least on a radially outward-facing surface of the sealing portion or of the centering portion, from a plastic filled with solid particles.

16. The permanent-magnet piston subassembly according to claim 8, wherein the sealing arrangement and/or the further sealing arrangement and/or the centering component is constituted, at least on a radially outward-facing surface of the sealing portion or of the centering portion, from PTFE or polyolefin filled with mica particles and/or graphite particles.

* * * * *